United States Patent [19]

Hough

[11] 4,165,763
[45] Aug. 28, 1979

[54] VALVE CONSTRUCTION

[75] Inventor: Walter J. Hough, Columbus, Ind.

[73] Assignee: Cummins Engine Company, Inc., Columbus, Ind.

[21] Appl. No.: 803,431

[22] Filed: Jun. 6, 1977

[51] Int. Cl.² ........................................... F16K 11/085
[52] U.S. Cl. ........................... 137/625.41; 137/625.47; 137/625.48; 60/602
[58] Field of Search ...................... 137/625.47, 625.41, 137/625.48; 60/602

[56] References Cited

U.S. PATENT DOCUMENTS

| 859,264 | 7/1907 | Travis | 137/625.41 X |
| 2,842,154 | 7/1958 | Lindsley | 137/625.47 X |
| 2,980,142 | 4/1961 | Turak | 137/625.41 X |
| 3,557,549 | 1/1971 | Webster | 60/602 |
| 3,939,871 | 2/1976 | Dickson | 137/625.47 |
| 4,008,572 | 2/1977 | Woollenweber | 60/602 |

FOREIGN PATENT DOCUMENTS 2602497  7/1977  Fed. Rep. of Germany ...... 137/625.47

Primary Examiner—Carlton R. Croyle
Assistant Examiner—Michael Koczo, Jr.
Attorney, Agent, or Firm—Neuman, Williams, Anderson & Olson

[57] ABSTRACT

A valve construction is provided for use in controlling fluid flow to a plurality of intake passageways. The valve construction is particularly suitable for use in an internal combustion engine to control the flow of exhaust gases to a turbocharger, the latter having a plurality of intake passageways communicating with the turbine section thereof. The valve construction includes a housing having an inlet for the engine exhaust gases and an outlet communicating with the intake passageways. Disposed within the housing and intermediate the inlet and outlet thereof is an adjustable valve piece which is adapted to be moved to selected positions of adjustment relative to said housing. When the valve piece is in a first selected position, exhaust gases flow through the housing to a first predetermined number of intake passageways. When the valve piece is adjusted to a second selected position, exhaust gases flow through the housing to a second predetermined number of intake passageways. The first predetermined number is of greater magnitude than the second predetermined number.

6 Claims, 13 Drawing Figures

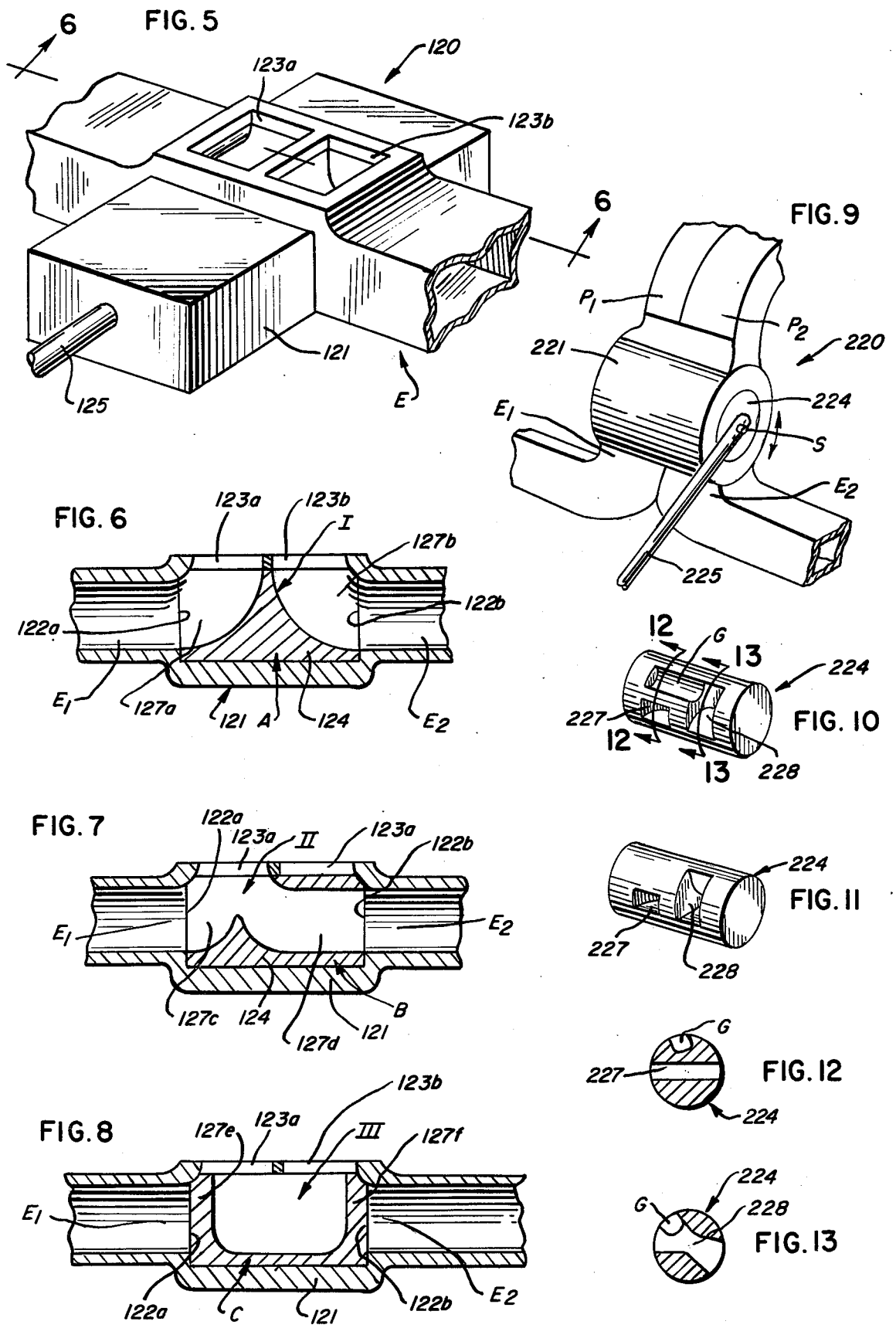

VALVE CONSTRUCTION

BACKGROUND OF THE INVENTION

Various devices have heretofore been provided for controlling the flow of exhaust gases in turbocharged internal combustion engines; however, such devices have been beset by one or more of the following shortcomings: (a) the device is of complex, costly construction and readily susceptible to malfunction; (b) the device is incapable of effectively and efficiently compensating for varying operating conditions (e.g., high, normal, or light load, and/or braking) of the engine; (c) adjustment of the device to compensate for various engine operating conditions is impeded by the exhaust gas flow to the turbine section of the turbocharger; and (d) the device is difficult and awkward to install on the engine and/or turbocharger.

SUMMARY OF THE INVENTION

Thus, it is an object of the invention to provide a valve of the type described which is not beset with any of the aforenoted shortcomings.

It is a further object of the invention to provide a valve of the type described which may be installed either in the casing of the turbine section of the turbocharger; separately from and between the turbocharger and the engine exhaust manifold; or in the engine's exhaust manifold system.

It is a further object of the invention to provide a valve of the type described which may be used with any turbocharger having divided intake passageways which are either of equal or unequal cross-sectional areas.

It is a still further object to provide a valve of the type described which may be used with turbochargers having turbine sections provided with twin flow, semi-divided, concentric or other multiple intake passageways.

It is a still further object to provide a valve of the type described which is readily capable of accommodating various operating conditions of the engine; such as normal engine speed, low engine speed and/or load, and compression braking of the engine.

Further and additional objects will appear from the description, accompanying drawings and appended claims.

In accordance with one embodiment of the invention, a valve of the type described is provided which comprises a housing having an inlet communicating with the discharge side of the engine exhaust manifold, and an outlet communicating with all of the intake passageways formed in the casing of the turbine section of the turbocharger. Adjustably mounted within the housing and disposed intermediate the inlet and outlet is a valve piece. The valve piece is adapted to be moved to selected positions of adjustment within the housing. When the valve piece is in a first selected position of adjustment, the exhaust gases flow in a normal manner through the housing into all of the intake passageways. When the valve piece is in a second selected position of adjustment, the exhaust gases flow through the housing but are directed to only a predetermined number of the intake passageways thereby effecting increased turbine speed. When the valve piece is in a third selected position of adjustment, the flow of the exhaust gases through the housing to the intake passageways is substantially cutoff, thereby effecting optimum compression braking of the engine.

DESCRIPTION

For a more complete understanding of the invention reference should be made to the drawings, wherein:

FIG. 1 is a fragmentary, perspective view of one form of the improved valve and having a portion of the housing thereof cut away so as to expose the valve piece disposed within the housing.

FIGS. 2, 3, and 4 are diagrammatic views of the valve of FIG. 1 but showing the valve piece in three selected positions of adjustment.

FIG. 5 is a fragmentary, perspective view of a second form of the improved valve.

FIG. 6 is a fragmentary, sectional view taken along line 6—6 of FIG. 5 and showing the valve piece in one position of adjustment.

FIGS. 7 and 8 are similar to FIG. 6 but showing the valve piece in different positions of adjustment.

FIG. 9 is a fragmentary perspective view of a third form of the improved valve.

FIGS. 10 and 11 are fragmentary perspective views of the valve piece disassembled from the valve of FIG. 9 and showing opposite exterior portions thereof.

FIGS. 12 and 13 are sectional views taken respectively along lines 12—12 and 13—13 of FIG. 10.

Figure 1:
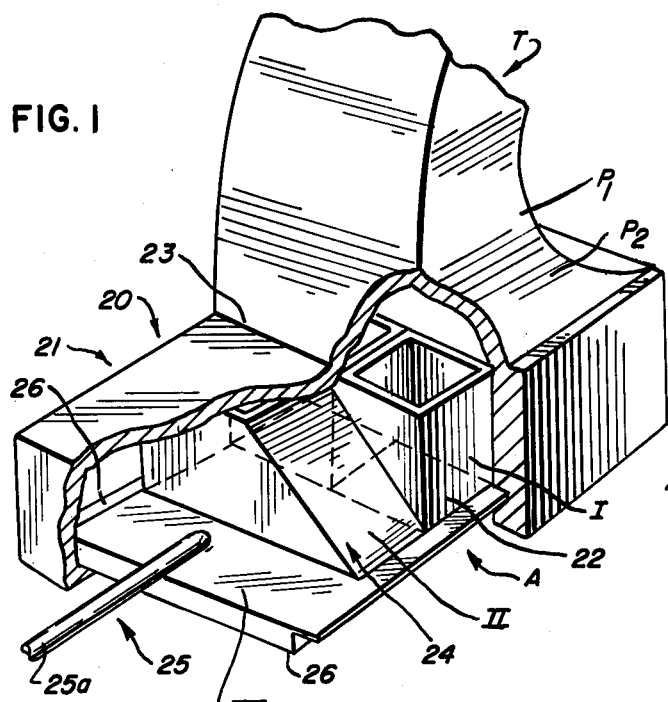

Referring now to the drawings and more particularly to FIG. 1, one form of the improved valve 20 is shown which is particularly suitable for use with an internal combustion engine having a turbocharger. The valve 20 is provided with a housing 21 which may be either a part of the casing of the turbine section T of the turbocharger, as shown in FIG. 1; a part of the engine exhaust manifold system, as shown in FIG. 5; or a separate unit disposed intermediate and connected to the turbine section casing and the exhaust manifold system, as shown in FIG. 9. The turbine section casing is provided with a plurality of intake passageways $P_1$, $P_2$, which in the illustrated embodiment is a pair of passageways of substantially like cross-sectional configuration and arranged in side-by-side relation. It is to be understood, of course, that the number of intake passageways, their relative location and cross-sectional configuration may be varied from that shown without departing from the scope of the invention. The housing 21 includes an inlet 22 which is adapted to communicate with the discharge ports $E_1$, $E_2$ of the exhaust manifold system. In addition housing 21 includes an outlet 23 which communicates with the intake passageways $P_1$, $P_2$. The housing, when required, may be provided with conventional exterior mounting flanges, not shown, for attaching the housing to the exhaust manifold system and/or the casing for the turbine section.

Figure 2:
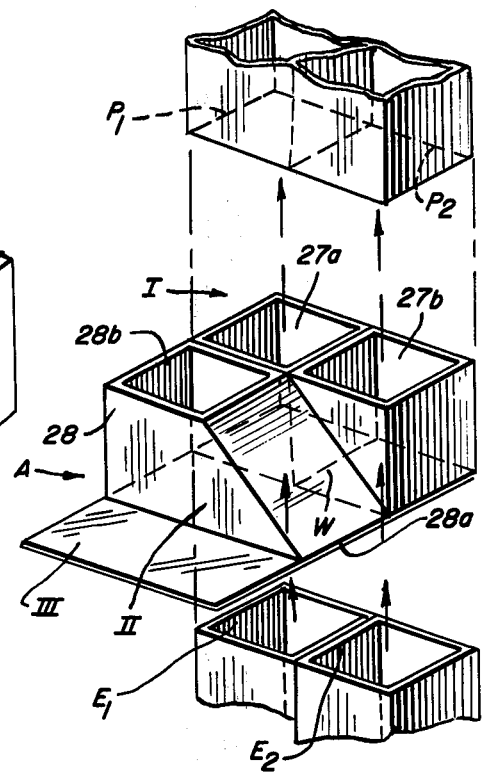
Figure 3:
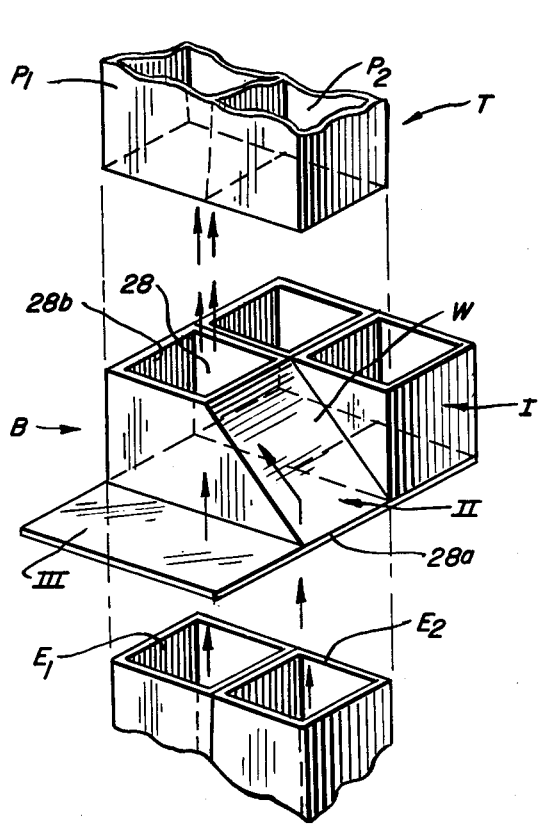
Figure 4:
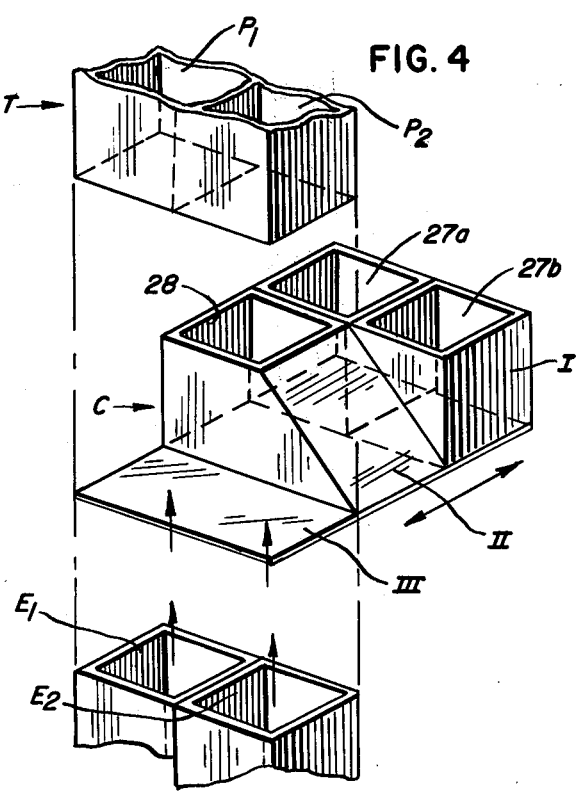

Mounted within housing 21 and disposed intermediate inlet 22 and outlet 23 is an adjustable valve piece 24, see FIG. 1. The valve piece, in the illustrated embodiment, is slidably adjusted to selected positions, A (FIG. 2), B (FIG. 3), and C (FIG. 4) by an elongated rod 25 having an exposed end 25a protruding from the housing 21. The movement of the valve piece 24 is restricted to a rectilinear path by a pair of elongated guide bars 26 which partially delimit the housing inlet 22, see FIG. 1. The exposed end 25a of the rod 25 may be engaged by a suitable mechanical, electrical or pneumatic actuating means, not shown. The actuating means may be automatically, semi-automatically or manually operated so that optimum performance or compression braking of the engine may be attained.

Valve piece 24, as illustrated in FIGS. 1–4, includes three segments I, II and III which are arranged in aligned side-by-side relation. Segment I includes a plurality of passages 27a, b which, when the valve piece is in position A, interconnect the discharge ports $E_1$, $E_2$ with all of the intake passageways $P_1$, $P_2$ of the turbine section casing. The discharge ports may be a part of a plurality of ducts, as shown, or in some instances may constitute a single port, not shown. The cross-sectional configurations of passages 27a, b preferably coincide with those of the corresponding passageways $P_1$, $P_2$ with which they are aligned when the valve piece 24 assumes position A.

Segment II is separated from segment I by a suitable partition or the like. Segment II has a single passage 28 which has one end 28a thereof of sufficient size so as to communicate with both discharge ports $E_1$, $E_2$. The opposite end 28b of passage 28 is substantially smaller in size and is adapted to be aligned only with intake passageway $P_1$ when the valve piece is disposed in position B. Thus, gas flow to intake passageway $P_2$ is cutoff by a diagonally disposed baffle or wall W, see FIG. 3, when the valve piece 24 is in position B, thereby causing a high concentration of gas flow in passageway $P_1$ which in turn results in increased rotation of the turbine and improved engine performance. Setting of the valve piece in position B normally occurs when the engine is at low speed or subjected to a light load.

Segment III consists of a substantially imperforate plate which is sized to overly the discharge ports $E_1$, $E_2$ and thereby substantially prevent gas flow through the housing 21 into the intake passageways. While segment III is shown as being totally imperforate it may, if desired, be provided with a small opening, not shown, through which a small amount of gas will continue to flow so as to cause the turbine wheel to continue to rotate at idling speed while at the same time enable the pressure of the exhaust gases to build up within the exhaust manifold and effect braking of the engine.

A second form of the improved valve 120 is shown in FIGS. 5–8 wherein the housing 121 thereof is made integral with the engine exhaust manifold system E. To facilitate understanding the similarities between valves 20 and 120, the corresponding components of the two valves will be given the same identifying numbers except in valve 120 they will be in the one hundred series.

Slidably disposed within housing 121 is a valve piece 124 which is adapted to assume three selected positions as in the case of valve piece 24. Movement of the valve piece to the various selected positions is effected through a rod 125 affixed at one end to a portion of the valve piece. Valve piece 124 consists of segments I, II and III which function in the same manner as the corresponding segments of valve piece 24, when the valve piece assumes the three selected positions of adjustment.

The housing 121 has a configuration different from housing 21 because of the relative location of discharge ports $E_1$, $E_2$ of the exhaust manifold system with respect to the intake passageways formed in the casing of the turbine section of the turbocharger. In housing 121, the exhaust gas inlets 122a, 122b therefor are arranged in spaced opposed relation and are aligned with discharge ports $E_1$, $E_2$ of the exhaust manifold system. The housing 121 is also provided with a pair of outlets 123a, 123b which correspond in number and location to the intake passageways formed in the casing for the turbine section, not shown in FIGS. 5–8.

Segment I of valve piece 124 is provided with a pair of curved passages 127a, 127b which interconnect the housing inlets and outlets when the valve piece is in the first selected position of adjustment A, see FIG. 6.

Segment II of valve piece 124, as seen in FIG. 7, is provided with two curved passages 127c, 127c, each of which at a corresponding one end communicates with and is aligned with a respective housing inlet 122a, 122b. The opposite ends of passages 127c, 127d are both aligned with the housing outlet 123a and, thus, no gas flows out through the housing outlet 123b.

Segment III of the valve piece 124 has a substantially U-shaped cross-sectional configuration, see FIG. 8, with upright imperforate flanges 127e, 127f which, when aligned with housing inlets 122a, 122b, are adapted to block gas flow through the valve 120. Blockage of the gas flow occurs only when the valve piece assumes the third selected position C.

It will be noted in both valves 20, 120 that the movement of the valve pieces 24, 124 is in a rectilinear direction which is transverse to the direction of the gas flow at the housing inlets. Thus, by reason of this fact, the movement of the valve piece is not impeded by the force of the gas flow. In many prior structures, the movement of the valve piece in at least one direction is contra to the gas flow.

FIGS. 9–13 disclose a third form of the improved valve 220 wherein the valve piece 224 thereof is cylindrically shaped and is rotatable about an axis which is substantially transverse to the direction of the gas flow through the housing 221. Rotation of the valve piece 224 to selected positions of adjustment relative to housing 221 is effected by an exposed handle 225 which has one end thereof secured to an axially disposed stub S protruding from the endface of the valve piece, see FIG. 9.

The housing 221 has a cylindrical chamber in which the valve piece is rotatably mounted. The discharge ports $E_1$, $E_2$ of the engine exhaust manifold system communicate with inlets formed in housing. Substantially diametrically opposite the inlets are a plurality of outlets, the number of which corresponds to the number of intake passageways $P_1$, $P_2$ formed in the turbine section casing.

As seen in FIGS. 10–13, the valve piece 224 is provided with a plurality of passages 227, 228. FIG. 10 is a view from the $E_1$, $E_2$ side of the valve looking in an upstream direction. FIG. 11 is a view from the $P_1$, $P_2$ side of the valve looking in a downstream direction. When the valve piece 224 is adjusted to a first selected position, passages 227, 228 will interconnect the discharge ports $E_1$, $E_2$ and the intake passageways $P_1$, $P_2$. When, however, the valve piece 224 is rotated approximately a quarter turn in a counter clockwise direction, as viewed in FIG. 9, passageway 227 will no longer be aligned with the corresponding discharge port $E_1$ of the exhaust manifold system, but instead an elongated channel-like groove G, formed in the exterior of the valve piece, will have one end portion of the groove in registration with the discharge port $E_1$. The opposite end of the groove G terminates at passage 228. Thus, when the valve piece 224 is in the second selected position, the gas flow from both of the discharge ports $E_1$, $E_2$ intermixes in passage 228 and then is directed to intake passageway $P_2$. It will be noted in FIG. 10, 11 and 13 that both ends of passage 228 are flared through a sector, approximately 90°. Thus, by having the flared ends of passage 228, the said passage will be in communication with at least discharge port $E_2$ and the intake passageway $P_2$ when the valve piece is in either the first or second selected positions.

When the valve piece 224 is rotated an additional quarter turn in a counter clockwise direction from the second selected position, both the passages 227, 228 are out of registration with the intake passageways $P_1$, $P_2$ and, thus, compression braking of the engine occurs.

As in the case of valves 20, 120, the valve piece 224 may be moved relative to the housing to the selected positions without being impeded by the gas flow in the discharge ports $E_1$, $E_2$.

While the valves 20, 120 and 220 have each been described as a three position valve, it is not intended to limit the invention thereto. In certain adaptations of the improved valve it might be desirable to have a two position valve or more than three positions. Furthermore, the number of discharge ports provided in the exhaust manifold system may be greater or less than the number shown in the drawings and the intake passageways formed in the casing of the turbine section may also be more than two, if desired. Where the number and relative location of the discharge ports and the intake passageways are different from that shown and described, the number and shape of the passages formed in the valve piece may be modified to meet the particular situation.

As aforementioned, the cross-sectional areas and configurations of the intake passageways may be dissimilar. Notwithstanding this fact, the improved valve is readily capable of accommodating such a condition.

Thus, it will be seen that a simple, compact, and inexpensive valve has been provided which enables the exhaust gases from a turbocharged internal combustion engine to be readily controlled so as to obtain optimum performance of the engine under varying operating conditions. Also, when desired, the improved valve is capable of providing effective compression braking of the engine. The improved valve may be installed between and separately from the turbine section of the turbocharger and the engine exhaust manifold system, or as an integral part of the manifold system or the casing for the turbine section. Furthermore, the adjustment of the valve piece of the improved valve is not impeded by the flow of the exhaust gas and, thus, requires a minimal amount of effort to effect such adjustment.

I claim:

1. A combination of a source of fluid under pressure, a plurality of independent fluid distribution passageways and a valve intermediate said source and passageways for controlling fluid flows from said source to predetermined numbers of said passageways; said valve including a housing having a fluid inlet connected to said source and fluid outlets spaced from said inlet and being connected to corresponding fluid distribution passageways, and a valve piece mounted within said housing for movement between selected positions of adjustment, said valve piece being disposed intermediate said housing inlet and outlets and provided with first and second fluid passages communicating with said housing inlet and a first predetermined number of said housing outlets, when said valve piece is in a first selected position of adjustment, and a third fluid passage having one end thereof communicating with said second passage and the opposite end thereof terminating at the exterior of said valve piece and being spaced from said first and second passages; the said opposite end of said third passage being in communication with said housing fluid inlet and said first passage being out of communication with said housing fluid inlet only when said valve piece is in a second selected position of adjustment, said second passage being in communication with said housing inlet and at least one housing outlet, when said valve piece is in either said first or second selected position of adjustment.

2. The combination of claim 1 wherein the valve piece is mounted for adjustment to a selected third position of adjustment wherein fluid flow through the housing and valve piece to any of the passageway inlets is substantially cut off.

3. The combination of claim 1 wherein the valve piece is mounted within the housing for rotary adjustment about an axis angularly disposed with respect to the direction of fluid flow at the housing inlet.

4. The combination of claim 1 wherein the valve piece is provided with external means for effecting selective adjustment thereof.

5. The combination of claim 1 wherein the fluid flow is to all of the passageway inlets, when said valve piece is in said first position of adjustment, and the fluid flow is to less than all of the passageway inlets, when said valve piece is in said second position of adjustment.

6. The combination of claim 1 wherein the valve piece is rotatably mounted within said housing and at least the opposite ends of said second passage are enlarged wherein said second passage remains in continuous communication with said housing inlet and at least one housing outlet while said valve piece is being rotated between said first and second selected positions of adjustment.

* * * * *

UNITED STATES PATENT AND TRADEMARK OFFICE
CERTIFICATE OF CORRECTION

PATENT NO. : 4,165,763
DATED : August 28, 1979
INVENTOR(S) : Walter J. Hough

It is certified that error appears in the above-identified patent and that said Letters Patent are hereby corrected as shown below:

Column 4, line 8 - 127c (2nd occurrence)

should be -- 127d --.

Signed and Sealed this

Twenty-second Day of January 1980

[SEAL]

Attest:

SIDNEY A. DIAMOND

Attesting Officer      Commissioner of Patents and Trademarks